(12) United States Patent
Li

(10) Patent No.: US 6,917,983 B1
(45) Date of Patent: Jul. 12, 2005

(54) REVERSE PATH FORWARDING USING A MULTICAST ROUTING TABLE

(75) Inventor: Yunzhou Li, Lowell, MA (US)

(73) Assignee: Nortel Networks Ltd (CA)

( * ) Notice: Subject to any disclaimer, the term of this patent is extended or adjusted under 35 U.S.C. 154(b) by 0 days.

(21) Appl. No.: 09/362,521

(22) Filed: Jul. 28, 1999

(51) Int. Cl.[7] .............................................. G06F 15/173
(52) U.S. Cl. ....................... 709/238; 370/389; 370/392
(58) Field of Search .................................. 709/238, 230, 709/239, 240, 241, 242, 249; 370/218, 251, 389, 392, 238, 408, 400; 716/13; 713/163

(56) References Cited

U.S. PATENT DOCUMENTS

| 5,881,246 | A | * | 3/1999 | Crawley et al. | ............ | 709/238 |
| 6,331,983 | B1 | * | 12/2001 | Haggerty et al. | ........... | 370/400 |

OTHER PUBLICATIONS

Introduction to IP Multicasting Routing, Maufer, S., 3Com Corp., Jan. 1997.*
Multicast routing in internetworks and extended LANs, Deering, S., ACM SIGCOMM Computer Communicatin Review, vol. 25, Issue Jan. 1995, ISSN:0146–4833, pp. 88–101.*
Performance under failure of Wide–Area datagram networks with Unicast and Multicast traffic routing, Shah, S.; Medhi, D., IEEEMilitary Comm. Conference, Proceedings MIL-COM 98, Oct. 1998, ISSN: 0–7830–4902, pp. 939–945.*
White Papers: IP Multicast ConfigurationGuide (Jul. 1999), pp. 1–14.*
Multicast routing extensions of OSPF, Moy, J., Proteon, Inc., Westborough, MA, ACM Periodical–Issue–Article, ISSN:0001–0782, 1994, pp. 61–67.*
Applications, Technologies, Architectures, and Protocols for Computer Communication Deering, S.; Estrin, D.; Farinacci, D.; Jacobson, V.; Liu, C.; Wei, L., SIGCOMM–ACM Special Interest Group on Data Communication, SBN: 0–89791–682–4, 1994, pp. 126–135.*
The PIM Architecture for Wide–Area Multicast Routing: Deering, S.; Estrin, D.; Farinacci, D.; Jacobson, V.; Liu, C.; Wei, L., IEEE/ACM Transactions on Networking, vol. 4, No. 2, Apr. 1996.*
A preservation–based multicast (RBM) routing protocol for mobile networks: initial route construction phase, Scott Carson, M.; Batsell, S.G.. Kluwer Academic Publisher, Hingham, MA, ACM Periodical–Issue–Article, ISSN:1022–0038, 1995, pp. 427–450.*
IP Multicast Initiative (IPMI) How IP Multicast Works: An IP Multicast Initiative White Paper—A Technical Overview of IP Multicast Concepts, Addressing, Group Management and Approaches to Routing; http://www.ipmulticast.com/community/whitepapers/ pp. 2–12, 1997.
Estrin et al., PIM–SM, Experimental, RFC 2362, p 2–66, Jun. 1998.

* cited by examiner

Primary Examiner—B. Prieto
(74) Attorney, Agent, or Firm—Steubing McGuinness & Manaras LLP

(57) ABSTRACT

A method of multicast routing includes receiving link state advertisements from routers in a network, constructing a short path tree multicast routing table from the received link state packets.

17 Claims, 10 Drawing Sheets

US 6,917,983 B1

REVERSE PATH FORWARDING USING A MULTICAST ROUTING TABLE

BACKGROUND OF THE INVENTION

This invention relates to multicast routing.

Computer networks enable computers on opposite sides of the world to exchange e-mail, internet web-pages, chat messages and other electronic information. Typically, the electronic information is stored in packets. A packet is like an envelope with a return address (the packet source) and a mailing address (the packet destination). Much as an envelope reaches its mailing address via a series of post offices, a network packet reaches its destination by winding its way through different computers in the network.

One type of network computer is known as a router. When a router receives a network packet, the router typically tries to figure out how to send the packet to its destination in the least amount of time.

SUMMARY OF THE INVENTION

In general, in one aspect, a method of multicast routing includes receiving link state advertisements from routers in a network and constructing a multicast routing table from the received link state packets that corresponds to a short path tree through multicast routers.

Embodiments may include one or more of the following features. The method may further include performing reverse path forwarding using the multicast routing table. The link state advertisements may be OSPF (Open Short Path First) link state advertisements and/or MOSPF (Multicast Open Short Path First) link state advertisements. Constructing the multicast routing table may include determining if a router is a multicast router. Constructing the multicast routing table comprises may include Dijkstra's short path algorithm. The multicast routing table may correlate addresses of destination multicast capable routers with addresses of multicast capable routers on a multicast short path tree. The method may further include constructing a unicast routing table from the received link state advertisements.

PIM (Protocol Independent Multicasting) may be configured to use the multicast routing table, for example, by configuring the PIM RPF_Check function. PIM may use the multicast routing table in dense and/or sparse modes.

In general, in another aspect, a method of multicast routing includes receiving MOSPF (Multicast Open Short Path First) link state advertisements from routers in a network and constructing a multicast routing table from the received link state packets. The multicast routing table correlates addresses of destination multicast capable routers with addresses of multicast capable routers on a multicast short path tree. The method further includes performing reverse path forwarding using the multicast routing table.

In general, in another aspect, a computer program product, disposed on a computer readable medium, for multicast routing, includes instructions for causing a computer to receive link state advertisements from routers in a network and construct a multicast routing table from the received link state packets, the table corresponding to a short path tree through multicast routers.

Advantages of the invention will become apparent in view of the following description, including the figures, and the claims.

DETAILED DESCRIPTION

Unicast Routing

Figure 1:
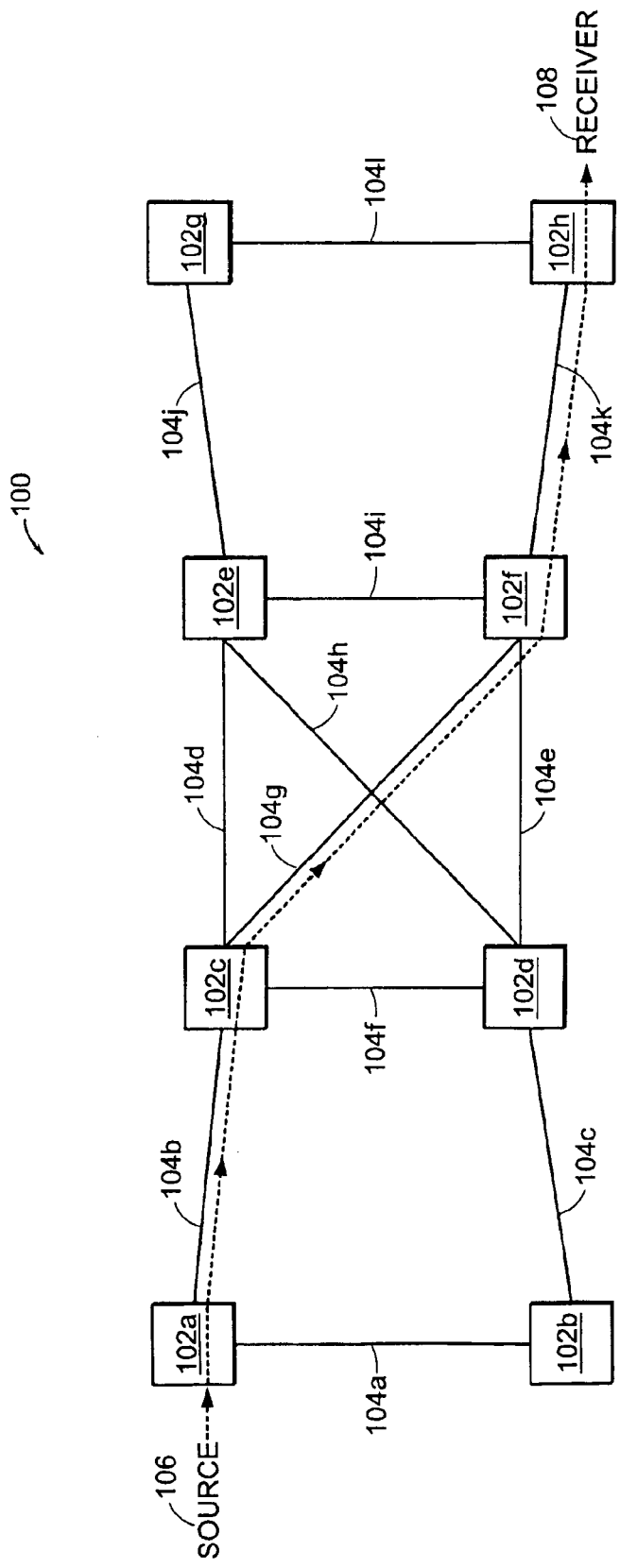
FIG. 1 is a diagram illustrating unicasting.

FIG. 1 shows a network of routers $102a$–$102h$ interconnected by links $104a$–$104l$. The links can be telephone lines, satellite links, etc. Each router $102a$–$102h$ can service a collection of local computers. For example, router $102a$ may handle network packets for all the computers on a LAN (local area network) at one office location (e.g., computer 106) while another router $102b$ handles network packets for computers on a LAN in a different office (e.g., computer 108).

Though a link does not directly connect two computers 106, 108, the computers 106, 108 can exchange packets using network connections $104a$–$104l$. For example, as shown, a source computer 106 can transmit a packet to destination computer 108 using a path over links $104b$, $104g$, and $104k$. Forwarding a packet from a single source 106 to a single destination 108 is known as "unicasting."

Figure 2:
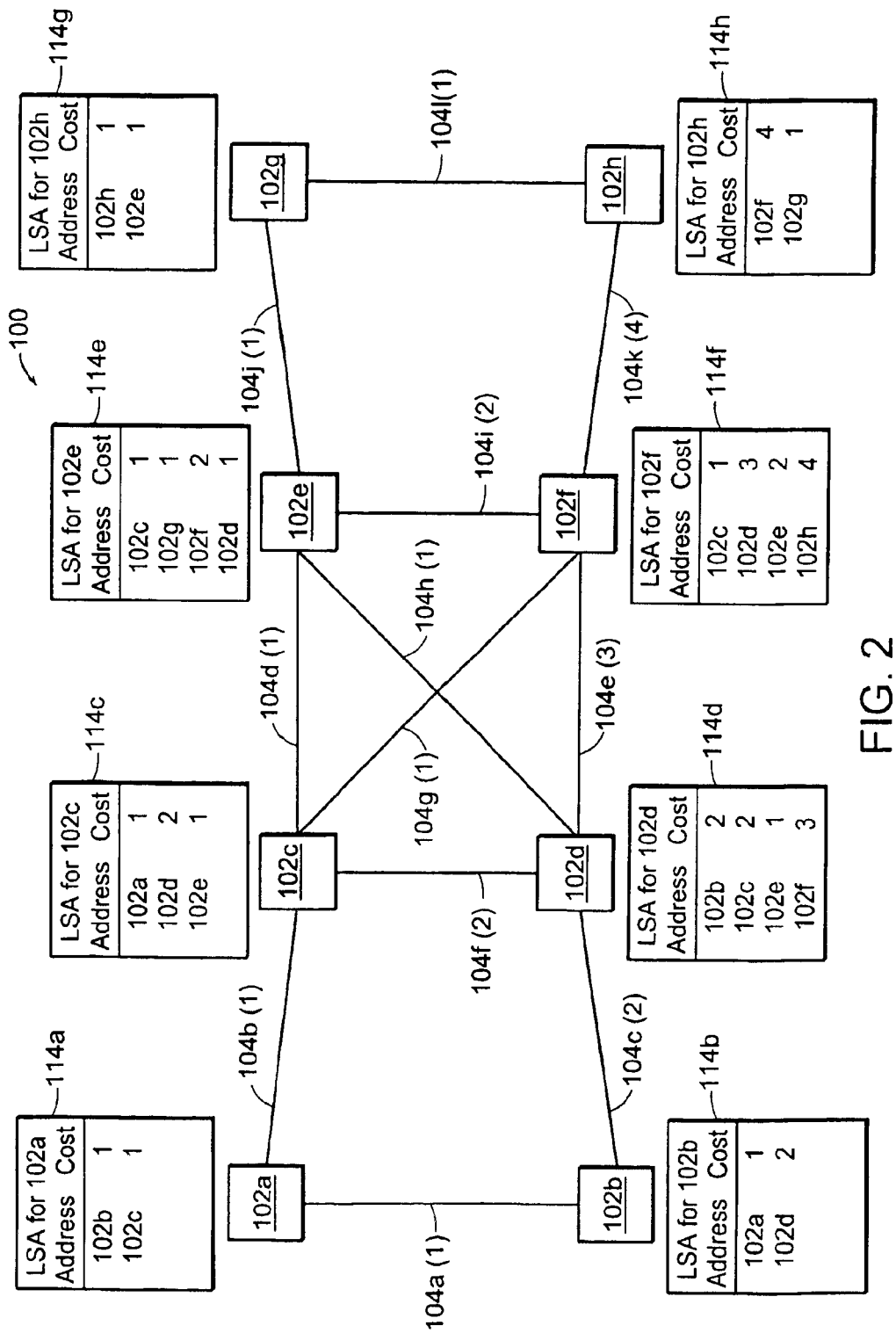
FIG. 2 is a diagram of a link state advertisements produced by network routers.

As shown in FIG. 2, each link $104a$–$104k$ can have an associated cost (shown in parenthesis). A cost can represent the distance between routers, the time it takes to send a packet over the link, or other characteristics of the link. For example, the cost to travel from router $102a$ to $102b$ is one unit, while the cost to travel from router $102b$ to $102d$ is two units.

To send packets along the fastest route between the packet's source and destinations, routers typically collect information about network links and their associated costs. A network administrator can choose from a wide variety of competing router protocols that collect and process network information differently. One such protocol is known as OSPF (Open Short Path First).

In OSPF, each router generates a link state advertisement (LSA) packet $114a$–$114h$ that includes data describing the cost of reaching connected routers. For example, the link state advertisement $114a$ for router $102a$ includes information describing the cost of reaching neighboring router $102c$ over link $104b$ (i.e., "1") and the cost of reaching neighboring router $102b$ over link $104a$ (i.e., "1"). After generating a link state advertisement packet, each router sends its link state packet $114a$–$114h$ to all other routers $104a$–$104k$ in the network. Thus, each router continually receives link state advertisement packets $114a$–$114h$ from other routers $140a$–$140h$, each packet describing a small patch of the network. Each router can knit the patches together to gain a complete picture of the network.

Figure 3:
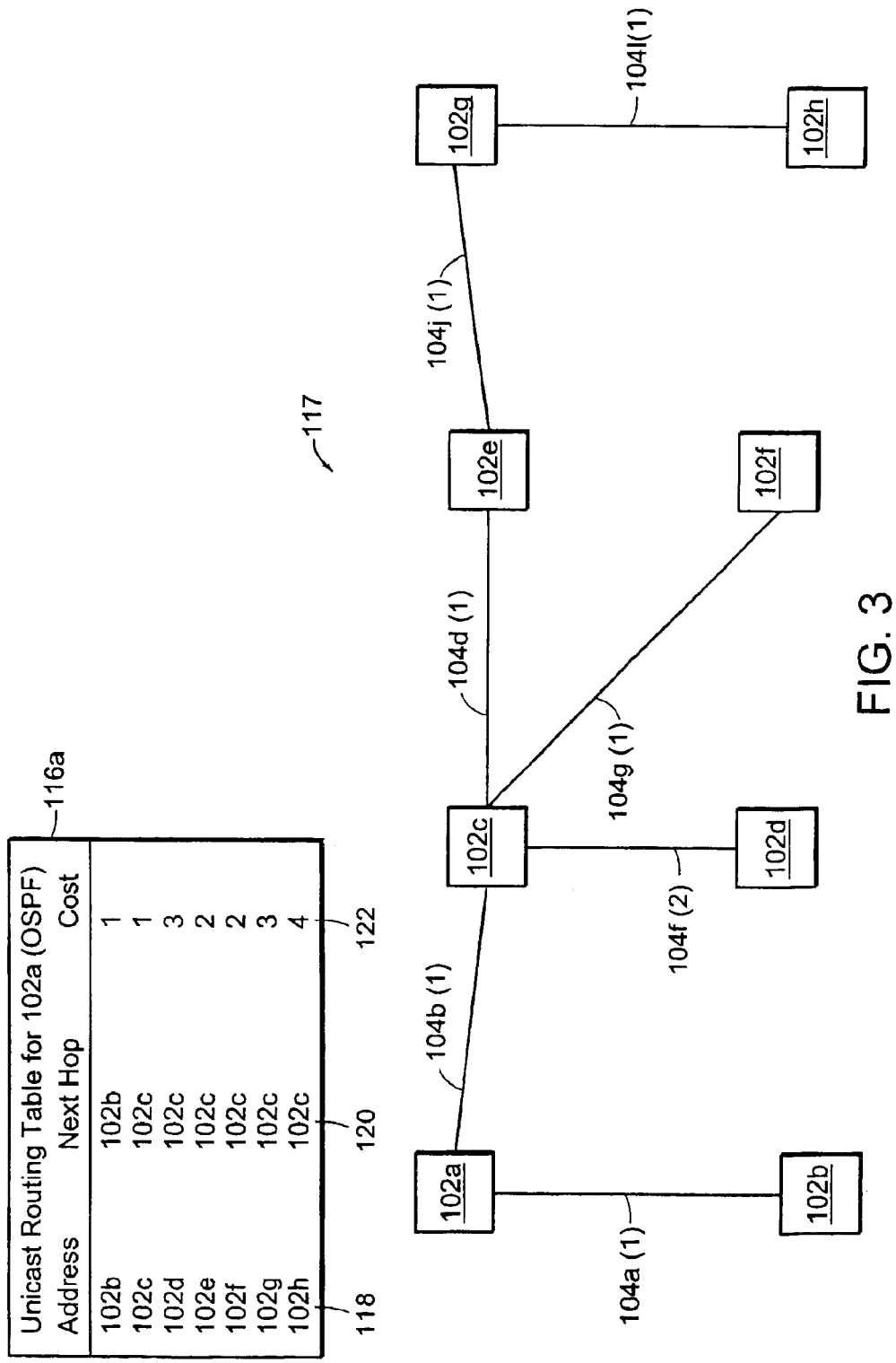
FIG. 3 is a diagram of a unicast short path tree.

As shown in FIG. 3, after receiving link state advertisements from other network routers 102a–102k, a router can determine the short path (e.g., the lowest costing) from itself to any other router on the network, for example, by using Dijkstra's short path algorithm.

FIG. 3 shows a short path tree 117 for the network of FIG. 3. The short path tree 117 offers a single path for connecting any two routers. For example, a packet sent on the short path tree from 102c to 102g will travel via links 104d and link 104j since this path has a cost of two. This path has the lowest cost of all paths shown in FIG. 2. For example, while a packet could reach 102g from 102c via links 104g, 1024, and 104l, this alternative path would have a cost of five.

In OSPF, each router builds a unicast routing table 116a that reflects the short path tree 117. The table 116a lists each possible router 118 destination (e.g., an IP address and mask), the next router 120 in the short path tree 117 path that leads to the destination 118, and other information such as the cost 122 of ultimately reaching the destination. For example, when router 102a receives a packet destined for a computer connected to router 102h, router 102a can look-up the destination router 102h and forward the packet to the next router 102c in the short path tree that leads to router 102h.

Multicast Routing

Unicast routing can quickly deliver a packet from a single source to a single destination. Sometimes, however, it can be advantageous to send the same message from a single source to multiple receivers.

Figure 4:
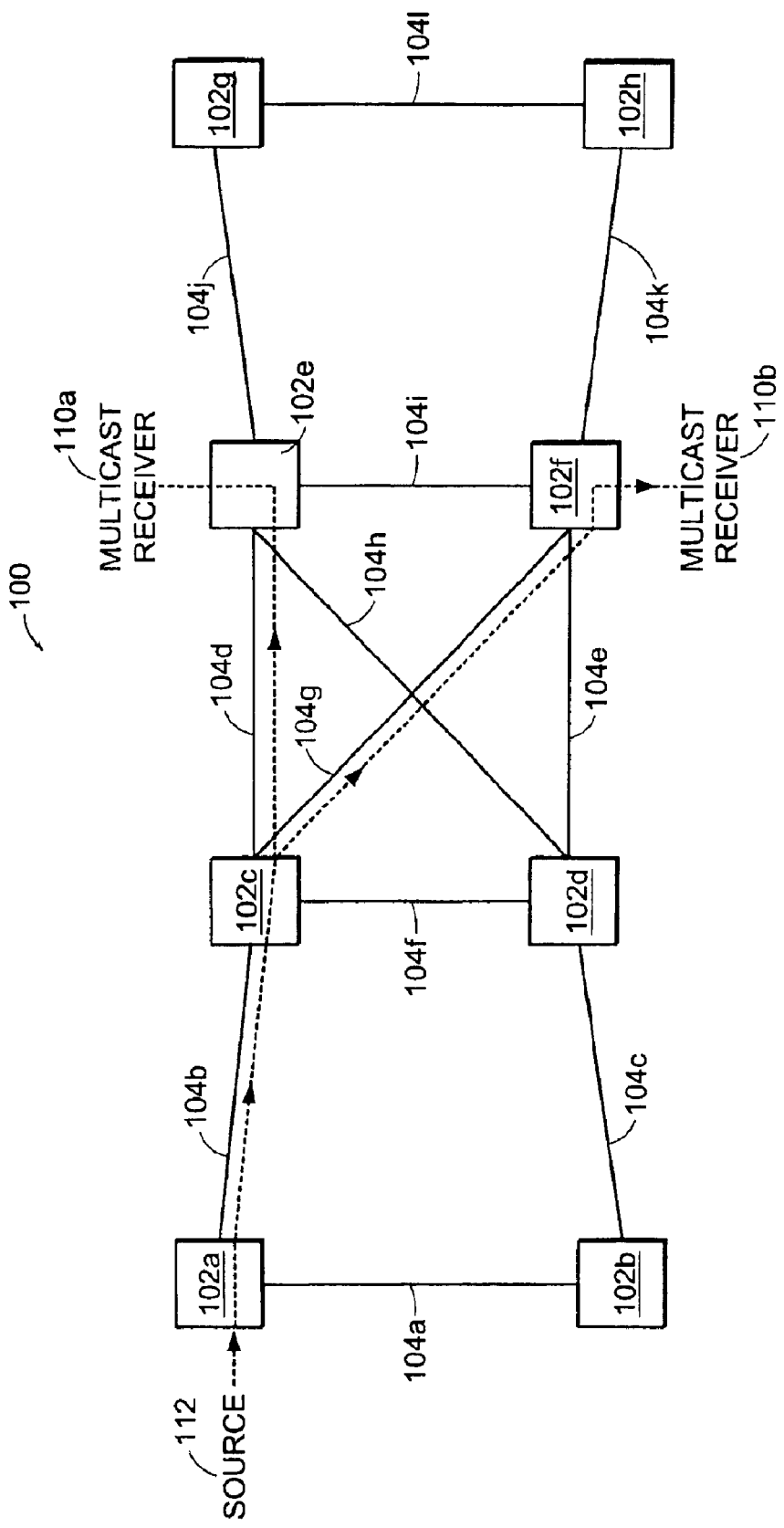
FIG. 4 is a diagram illustrating multicasting.

FIG. 4 shows an example of multicasting. As shown in FIG. 4, rather than unicasting a packet from source 112 to receiver 110a and unicasting a packet from source 112 to receiver 110b, multicast routers can make copies of a packet when paths to multicast destinations 110a, 110b split. For example, when source 112 sends a packet to multicast receivers 110a and 110b, the paths to these two receivers 110a, 110b overlap until they reach router 102c. Multicast router 102 can make a copy of the packet and send one to multicast receiver 110a via link 104d and send another to multicast receiver 110b via link 104g. Multicasting thus reduce the number of packets traveling between shared transmission paths.

Many different protocols support multicasting. One such protocol is PIM (Protocol Independent Multicasting). The PIM protocol is an attempt to provide a multicasting protocol that does not rely on a particular unicast protocol. Two versions of PIM address different multicasting situations. PIM-DM (Dense Mode) is designed for multicasting a message to many receivers connected to a network. PIM-SM (Sparse Mode) is designed for multicasting a message to a few receivers scattered about a network. Both versions of PIM use a technique known as reverse path forwarding (RPF).

Figure 5:
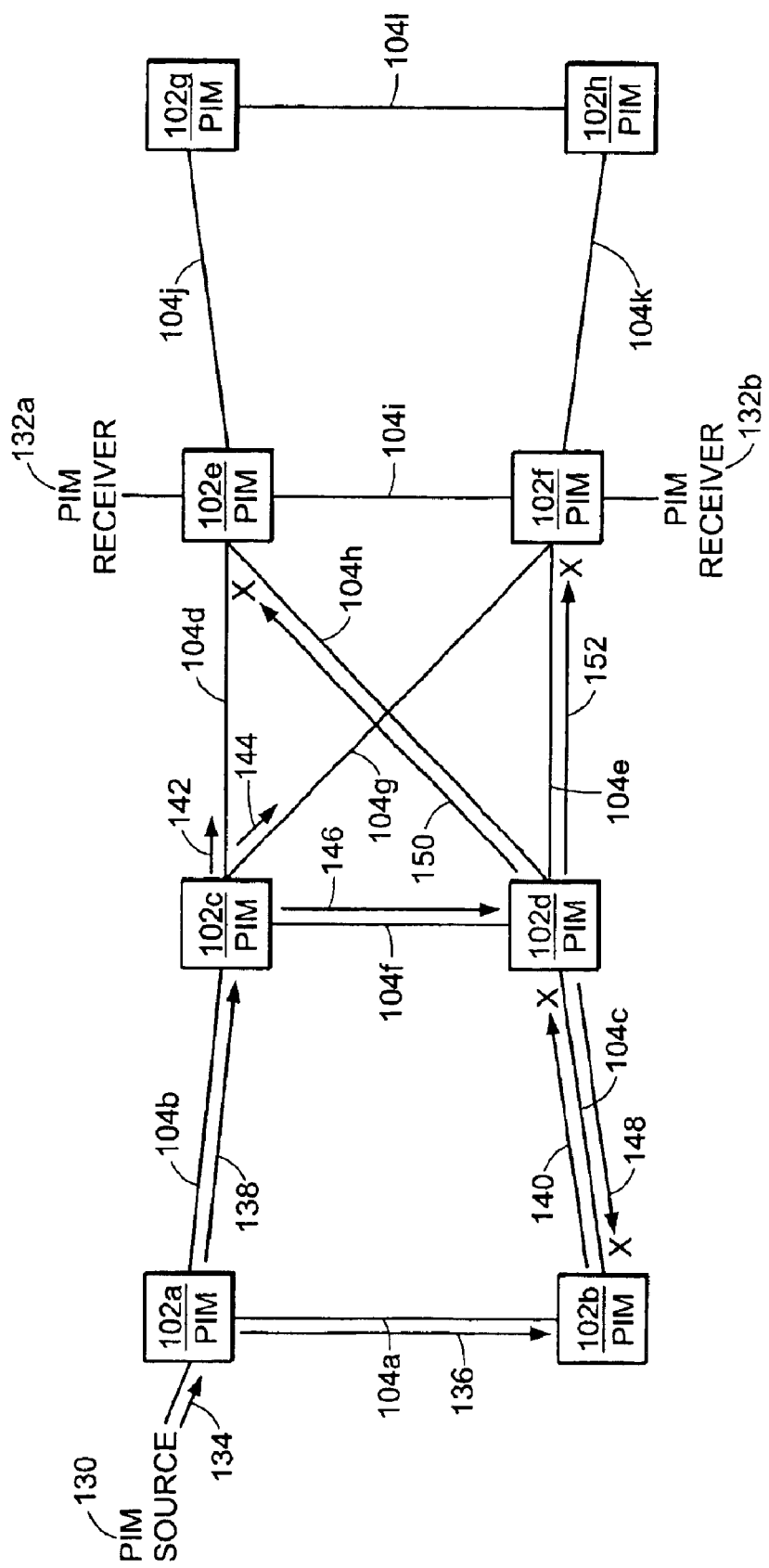
FIG. 5 is a diagram illustrating reverse path forwarding.

FIG. 5 shows a network of routers 102a–102h conforming to the PIM protocol. As shown, a source 130 sends a packet to PIM router 102a for multicast group members 132a, 132b. In reverse path forwarding, a router that receives a packet determines whether the packet arrived via a link on the short path tree. If so, the router transmits the received packet on all its network connections, save the connection that delivered the packet to the router. If the packet did not travel over the short path tree, the receiving router drops the packet.

For example, as shown in FIG. 5, a source 130 transmits a packet to router 102a. Router 102a, in turn, transmits the packet on connection 104b to router 102c (arrow 138) and on connection 136 to router 102b (arrow 136). Router 102b can determine whether the arrival of a packet from router 102a via link 104a is a path on the unicast short path tree (FIG. 4) by looking-up the address in its unicast routing table. Since, the packet arrived via the unicast short path tree, router 102b forwards the packet to all its other connections 140 (arrow 140). Router 102d, however, will drop the packet (shown as an "x") because the packet did not arrive from the "short path" link. In fact, router 102d will drop all packets other than those received from router 102c.

Figure 6:
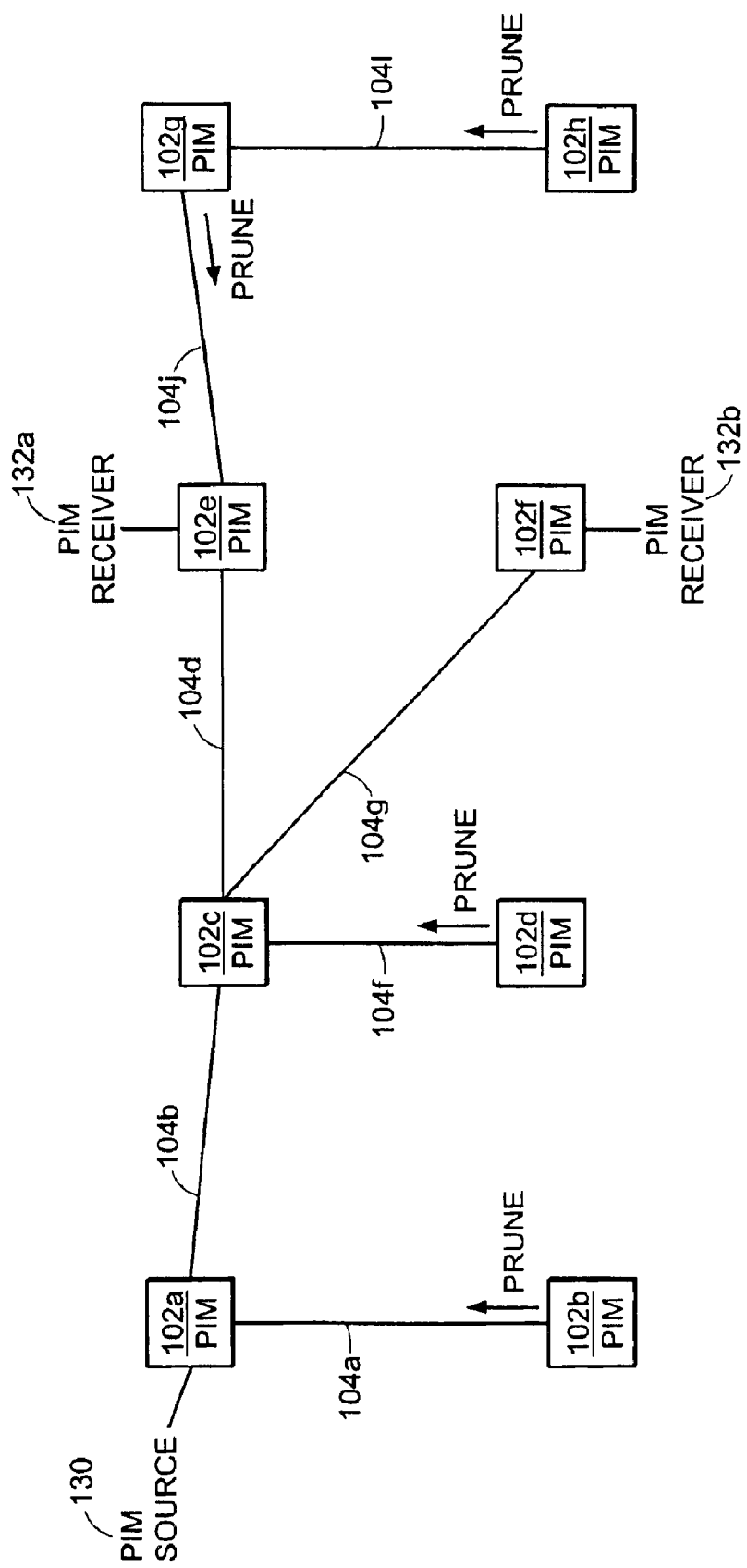
FIG. 6 is a diagram of a multicast tree produced by reverse path forwarding.

FIG. 6 shows the paths of packets not dropped by routers using reverse path forwarding. Since each router used a unicast routing table to perform reverse path forwarding, the multicast tree has the same appearance as the unicast tree (FIG. 3). In PIM, routers 102b, 102d, 102g, 102f, 102h that do not connect to multicast receivers 132a, 132b transmit "prune" messages to simplify the tree.

Figure 7:
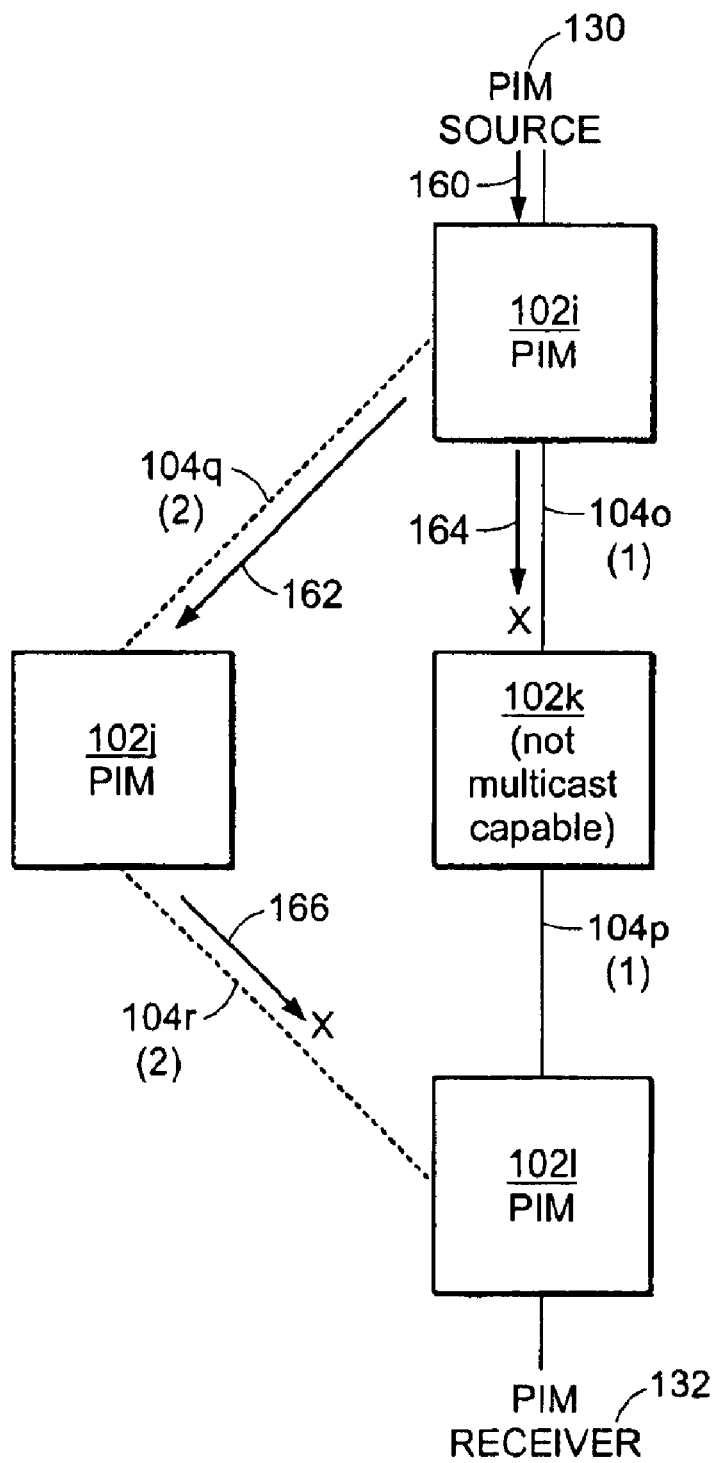
FIG. 7 is a diagram of a network that includes computers conforming to the PIM (Protocol Independent Multicasting) protocol and a computer that does not.

FIG. 7 shows a network where not all the routers 102i–102l run PIM. In this environment scenario, the PIM scheme can break down. When PIM router 120i receives a packet from PIM source 130, router 102i will transmit the packet to router 102j over connection 104q and to router 102k over connection 104o. Router 102k does not support PIM multicasting and simply drops the received packet. Router 102j receives the packet from router 102i and forwards the packet to router 102l. When router 102l examines a unicast routing table to perform reverse path forwarding, router 102l determines that the packet (arrow 166) did not come via the short path in the unicast short path tree (i.e., link 104p). Router 102l drops the packet and PIM multicasting fails to deliver the packet to a designated receiver 132.

Figure 8:
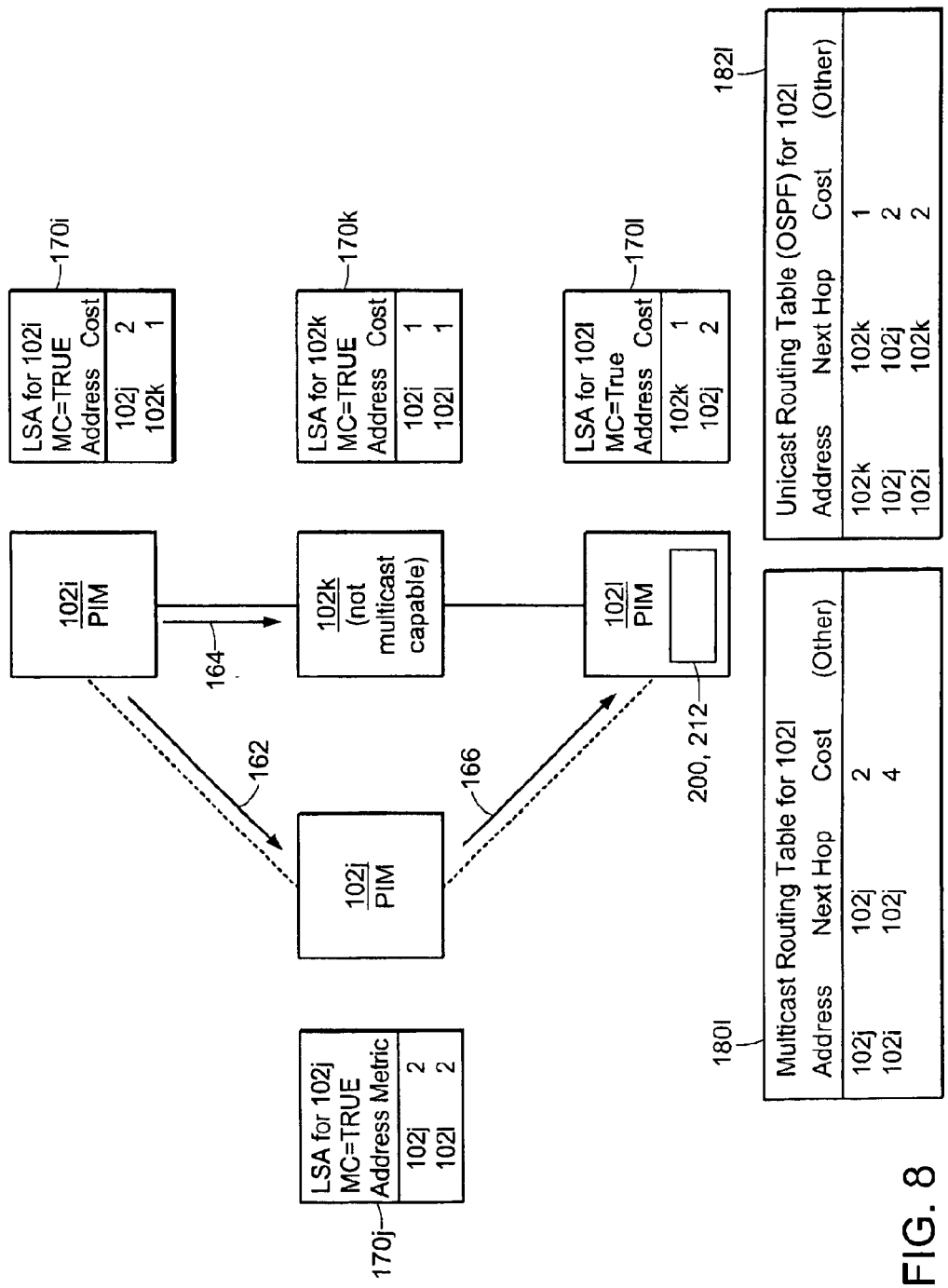
FIG. 8 is a diagram illustrating use of a multicast routing table.

FIG. 8 shows a technique for addressing the problem illustrated in FIG. 7. The MOSPF (Multicast Open Short Path First) protocol adds an "MC" (multicast capable) bit to the link state advertisements of OSPF. If PIM routers 102I, 102j, 102l use MOSPF to generate link state advertisements 170i, 170j, 170l, PIM router 102l will receive not only the arrangement and costs of connections in the network, but also information describing which routers support multicasting. Using the information received from the link state advertisements, router 102l can generate a multicast routing table 180l in addition to a unicast routing table 182l. For example, the router 102l can use Dijkstra's short path tree algorithm to determine a multicast short path tree that connects only the multicast routers. The multicast short path tree typically differs from the unicast short path tree.

Software can configure router 102l to use the multicast routing table 180l instead of the unicast routing table 182l when performing the reverse path forwarding for received multicast packets. Thus, when router 102l receives a multicast message from router 102j, instead of dropping the packet, the router 102j can access the multicast routing table 180l and determine that the packet came over a connection in the multicast short path tree. Thus, the PIM multicasting techniques can successfully deliver multicast messages even though not every router conforms to the PIM protocol.

Using the link state packets of MOSPF as the mechanism for building the multicast routing table 180l can offer many benefits. For example, the link state packet approach adapts quickly to changes in the network, for example, when a router has problems, or the cost between routers changes due to traffic congestion.

Figure 9:
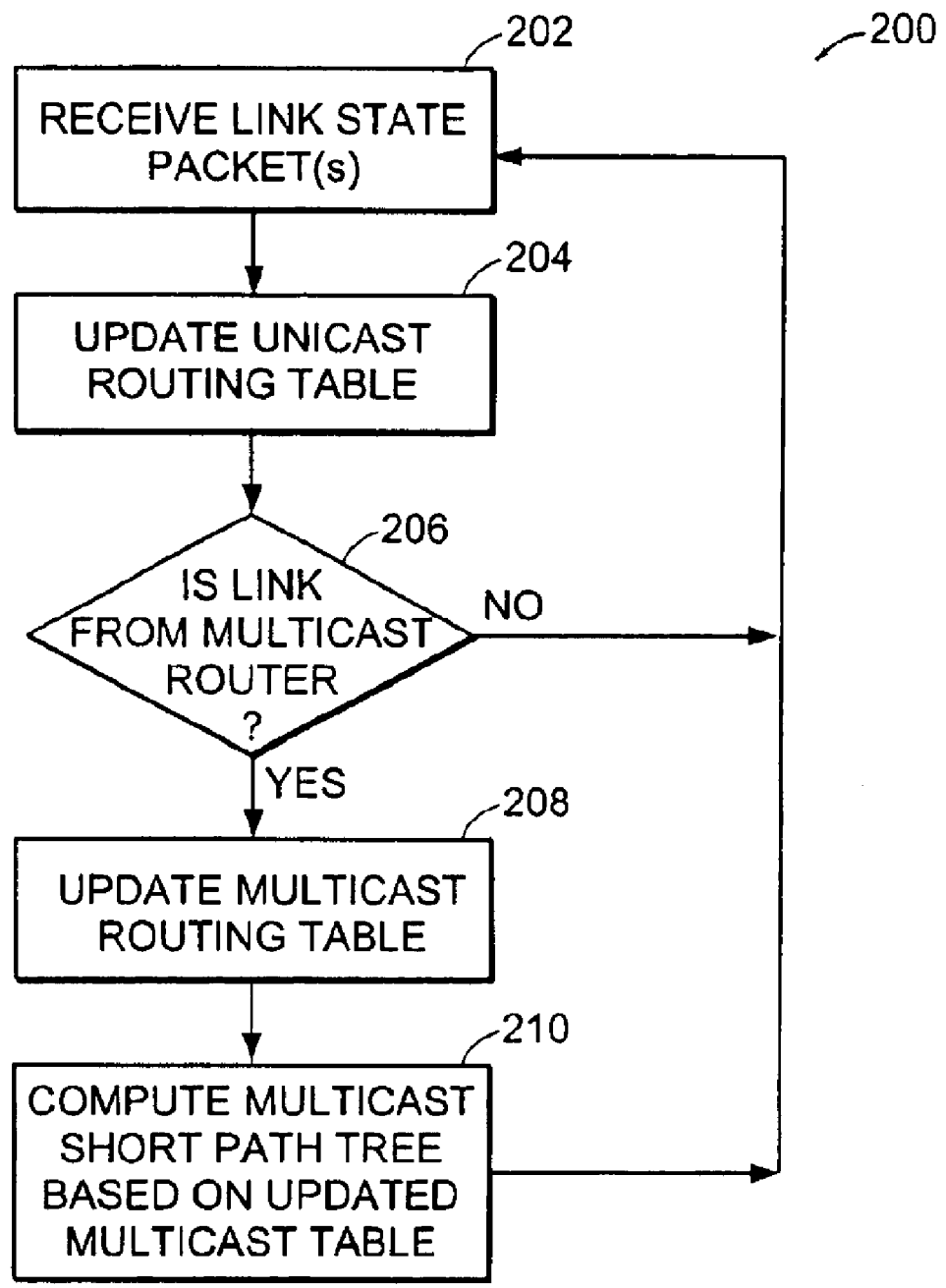
FIG. 9 is a flow chart of a process for producing a multicast routing table.

FIG. 9 shows a process 200 for building a multicast routing table. After receiving a link state advertisement 202, a router can update its unicast routing table 204. If the link state advertisement includes an multicast bit 206, the router can also update the multicast routing table 208 by determining the multicast short path tree through multicast capable routers (e.g., those routers setting the MC bit).

Figure 10:
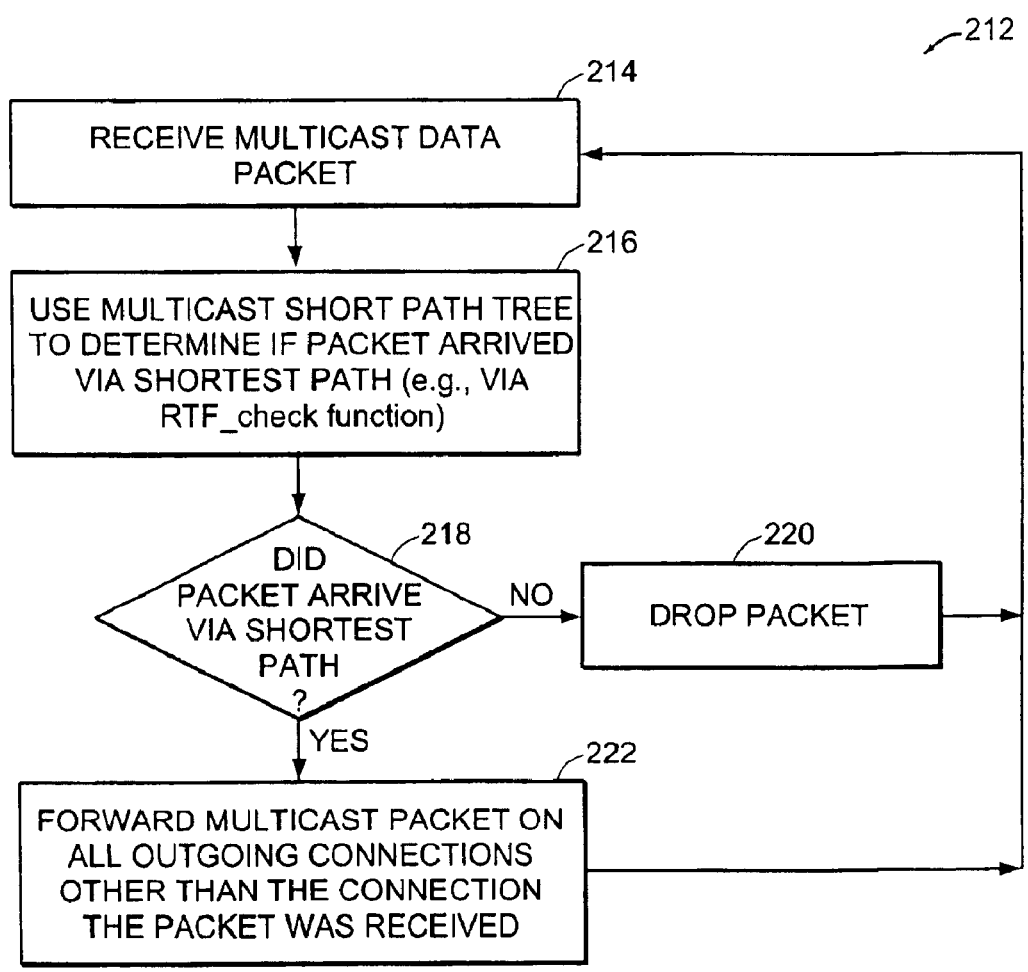
FIG. 10 is a flow chart of a process for performing reverse path forwarding using the multicast routing table.

FIG. 10 shows a process 212 can use the multicast routing table to perform multicast reverse path forwarding. For example, PIM uses an RPF_Check function whenever determining reverse path forwarding. PIM can be configured to call a function that uses the multicast routing table to determine whether a packet was received from link on the short path tree. Thus, after receiving a multicast data packet 214, PIM calls the supplied RPF_Check function. The RPF_Check function examines the multicast forwarding table 216 to determine whether the packet was received on the multicast short path tree. PIM can then determine whether to drop 220 or forward 222 the packet. PIM calls the RPF_Check function in a variety of circumstances both in sparse-mode and in dense-mode.

EMBODIMENTS

The techniques described here are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and nonvolatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. however, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-readable medium having instructions for performing a method of multicast routing with a multicast capable router in a newtowrk including a plurality of routers, wherein only a subset of the routers are capable of multicast, comprising the steps of:

receiving, at the multicast capable router, link state advertisements from routers in the network;

examining, at the multicast capable router, each link state advertisement to determine whether the link state advertisement includes a multicast capable bit indicating whether an associated router supports multicast;

employing the received link state advertisements for constructing a multicast routing table and a unicast routing table, the multicast routing table corresponding to a short path tree through only multicast capable routers, wherein the multicast routing table includes a plurality of routing entries, and wherein routing entries are placed in the multicast routing table only for link state advertisements having the multicast capable bit set indicating that the associated router is a multicast router; and performing reverse path forwarding using the multicast routing table in support of routing multicast packets, whereby the multicast capable router is able to recognize and forward a multicast packet that is received via a path that is not indicated as the shortest path in the unicast routing table.

2. The method of claim 1 wherein the link state advertisements comprise OSPF (Open Short Path First) link state advertisements.

3. The method of claim 1 wherein the link state advertisements comprise MOSPF (Multicast Open Short Path First) link state advertisements.

4. The method of claim 1 wherein constructing the multicast routing table comprises using Dijkstra's short path algorithm.

5. The method of claim 1 wherein the multicast routing table correlates addresses of destination multicast capable routers with addresses of multicast capable routers on a short path tree of multicast capable routers.

6. The method of claim 1 wherein using the multicast routing table comprises configuring PIM (protocol Independent MUlticasting) to use the multicast routing table.

7. The method of claim 6 wherein configuring comprises providing a routine for a PIMRPF_Check function.

8. The method of claim 1 wherein PIM uses the multicast routing table to perform reverse path forwarding in sparse mode.

9. The method of claim 1, wherein PIM uses the multicast routing table to perform reverse path forwarding in dense mode.

10. A computer-readable medium having instructions for performing a method of multicast routing, comprising:

receiving MOSPF (Multicast Open Short Path First) link state of advertisements from routers in a network;

constructing a multicast routing table and a unicast routing table from the received link state packets, the multicast routing table correlating addresses of destination multicast capable routers with addresses of multicast capable routers on a short path tree of multicast capable routers, wherein the multicast routing table includes a plurality of routing entries, and wherein routing entries are placed in the multicast routing table only foir link state advertisements having a multicast capable bit set indicating that the associated router is a multicast router; and performing reverse path forwarding using the multicast routing table upon receipt of a multicast packet.

11. The method of claim 10 wherein multicast routing comprises routing in accordance with the Protocol Independent Multicasting (PIM) protocol.

12. The method of claim 10 wherein multicast routing comprises routing in accordance with the Protocol Independent Multicasting (PIM) protocal.

13. A computer program product, disposed on a computer readable medium, for multicast routing, the computer program including instructions for causing a computer to:

receive link state advertisements from a routers in a network;

examine each link state advertisement to determine whether the link state advertisement includes a multicast capable bit indicating whether an associated routers supports multicasting; and construct a multicast routing table and a unicast routing table from the received link state packets, the multicast routing table corresponding to a short path tree through multicast routers, wherein the multicast routing table includes a plurality of routing entries, and wherein routing entries are placed in the multicast routing table by the computer program product only for link state advertisements having a multicast capable bit set in the link state advertisement indicating that the associated router is a multicast router; and instructions for performing reverse path forwarding using the multicast routing table.

14. The computer program of claim 13 further comprising instructions for performing reverse path forwarding using the multicast routing table.

15. The computer program of claim 13 wherein the link state advertisements comprise MOFPF (Multicast Open Short Path First) link state advertisements.

16. The computer program of claim 13 wherein the multicast routing table correlates addresses of destination multicast capable routers with addresses of multicast capable routers on a short path tree of multicast capable routers.

17. The computer program of claim 13 wherein multicast routing comprises multicast routing using the Protocol Independent Multicasting (PIM) protocol.

* * * * *